US011941885B2

(12) United States Patent
Balannik

(10) Patent No.: US 11,941,885 B2
(45) Date of Patent: Mar. 26, 2024

(54) GENERATING A HIGHLIGHT VIDEO FROM AN INPUT VIDEO

(71) Applicant: AnyClip Ltd., Givatayim (IL)

(72) Inventor: Vadim Balannik, Rehovot (IL)

(73) Assignee: AnyClip Ltd., Givatayim (IL)

( * ) Notice: Subject to any disclaimer, the term of this patent is extended or adjusted under 35 U.S.C. 154(b) by 110 days.

(21) Appl. No.: 17/712,253

(22) Filed: Apr. 4, 2022

(65) Prior Publication Data

US 2023/0260284 A1   Aug. 17, 2023

Related U.S. Application Data

(63) Continuation-in-part of application No. 17/665,636, filed on Feb. 7, 2022, now abandoned, and a continuation-in-part of application No. 17/585,679, filed on Jan. 27, 2022, now Pat. No. 11,677,991.

(51) Int. Cl.
| | |
|---|---|
| *G06V 20/40* | (2022.01) |
| *G06V 10/74* | (2022.01) |
| *G06V 10/762* | (2022.01) |
| *G06V 10/774* | (2022.01) |
| *G11B 27/031* | (2006.01) |

(52) U.S. Cl.
CPC ........... *G06V 20/47* (2022.01); *G06V 10/761* (2022.01); *G06V 10/762* (2022.01); *G06V 10/7747* (2022.01); *G06V 20/41* (2022.01); *G11B 27/031* (2013.01)

(58) Field of Classification Search
CPC ............ H04N 21/8549; G06V 10/761; G06V 10/7747; G06V 20/41; G06V 20/47
See application file for complete search history.

(56) References Cited

U.S. PATENT DOCUMENTS

| 7,466,858 | B2 | 12/2008 | Denoue et al. |
| 8,254,671 | B1 | 8/2012 | Roth et al. |
| 9,578,377 | B1 | 2/2017 | Malik et al. |
| 10,412,391 | B1 | 9/2019 | Balannik |
| 11,144,764 | B1 * | 10/2021 | Sharma ............ H04N 21/43076 |
| 2005/0078868 | A1 | 4/2005 | Chen |
| 2005/0154679 | A1 | 7/2005 | Bielak |

(Continued)

OTHER PUBLICATIONS

Official Action dated Dec. 6, 2022 from the US Patent and Trademark Office Re. U.S. Appl. No. 17/585,679. (16 pages).

(Continued)

*Primary Examiner* — Hsiungfei Peng
*Assistant Examiner* — Fred Peng

(57) ABSTRACT

A computer implemented method of generating at least one highlight video from an input video, comprising, using at least one processor for: identifying a plurality of significant frames of the input video, computing video-level features of the input video, selecting a plurality of subsets of the plurality of significant frames, for each subset, computing a similarity score indicating similarity between visual features of the subset and video-level features of the input video, clustering the input video into a plurality of clusters of sequential frames according to sequential positions within the video based on the similarity scores correlated with the plurality of significant frames, and creating at least one highlight video by selecting a cluster of sequential frames of the input video.

22 Claims, 3 Drawing Sheets

(56) References Cited

U.S. PATENT DOCUMENTS

| | | | |
|---|---|---|---|
| 2006/0120697 A1* | 6/2006 | Beged-Dov | H04N 21/262 |
| | | | 348/E7.071 |
| 2011/0064381 A1 | 3/2011 | Circlaeys et al. | |
| 2012/0229629 A1 | 9/2012 | Blumstein-Koren et al. | |
| 2016/0042251 A1 | 2/2016 | Cordova-Diba et al. | |
| 2018/0077440 A1 | 3/2018 | Wadhera et al. | |
| 2018/0246983 A1 | 8/2018 | Rathod | |
| 2019/0279685 A1 | 9/2019 | Klinger et al. | |
| 2020/0007934 A1* | 1/2020 | Ortiz | G06Q 30/0243 |
| 2021/0021912 A1 | 1/2021 | Rozhenkov et al. | |
| 2021/0144442 A1* | 5/2021 | Liu | H04N 21/4668 |
| 2021/0397641 A1 | 12/2021 | Flider et al. | |
| 2022/0053039 A1 | 2/2022 | Bhatt et al. | |
| 2022/0132223 A1* | 4/2022 | Wu | H04N 21/8456 |
| 2022/0301579 A1 | 9/2022 | Cao et al. | |
| 2022/0327402 A1 | 10/2022 | Tiwari et al. | |
| 2023/0140369 A1* | 5/2023 | Aminian | G06F 16/739 |
| | | | 382/103 |
| 2023/0230378 A1* | 7/2023 | Rüfenacht | G06V 20/47 |
| | | | 382/100 |

OTHER PUBLICATIONS

Official Action dated Aug. 23, 2022 from US Patent and Trademark Office Re. U.S. Appl. No. 17/665,636. (18 pages).

Notice of Allowance dated Feb. 24, 2023 from the US Patent and Trademark Office Re. U.S. Appl. No. 17/585,679. (6 pages).

* cited by examiner

GENERATING A HIGHLIGHT VIDEO FROM AN INPUT VIDEO

RELATED APPLICATIONS

This application is a Continuation-in-Part (CIP) of U.S. patent application Ser. No. 17/585,679 filed on Jan. 27, 2022. This application is also a Continuation-in-Part (CIP) of U.S. patent application Ser. No. 17/665,636 filed on Feb. 7, 2022. The contents of the above applications are all incorporated by reference as if fully set forth herein in their entirety.

FIELD AND BACKGROUND OF THE INVENTION

The present invention, in some embodiments thereof, relates to generation of videos and, more specifically, but not exclusively, to generation of a preview video from a main video.

Video recordings of events, scenes and/or the like is constantly growing as it is applied in a plurality of market segments, applications, services, platforms and systems, for example, security, public order, autonomous vehicles, gaming, education, healthcare, business conference calls and many more.

For videos that are long, a short preview video is produced by selecting frames and shorter segments from a main video. The short preview videos is designed to summarize the main video to a viewer, to enable the viewer to decide if they wish to watch the main video.

SUMMARY OF THE INVENTION

According to a first aspect, a computer implemented method of generating at least one highlight video from an input video, comprises, using at least one processor for: identifying a plurality of significant frames of the input video, computing video-level features of the input video, selecting a plurality of subsets of the plurality of significant frames, for each subset, computing a similarity score indicating similarity between visual features of the subset and video-level features of the input video, clustering the input video into a plurality of clusters of sequential frames according to sequential positions within the video based on the similarity scores correlated with the plurality of significant frames, and creating at least one highlight video by selecting a cluster of sequential frames of the input video.

According to a second aspect, a system for generating at least one highlight video from an input video, comprises: at least one processor executing a code for: identifying a plurality of significant frames of the input video, computing video-level features of the input video, selecting a plurality of subsets of the plurality of significant frames, for each subset, computing a similarity score indicating similarity between visual features of the subset and video-level features of the input video, clustering the input video into a plurality of clusters of sequential frames according to sequential positions within the video based on the similarity scores correlated with the plurality of significant frames, and creating at least one highlight video by selecting a cluster of sequential frames of the input video.

According to a third aspect, a non-transitory medium storing program instructions for generating at least one highlight video from an input video, which, when executed by at least one processor, cause the at least one processor to: identify a plurality of significant frames of the input video, compute video-level features of the input video, select a plurality of subsets of the plurality of significant frames, for each subset, compute a similarity score indicating similarity between visual features of the subset and video-level features of the input video, cluster the input video into a plurality of clusters of sequential frames according to sequential positions within the video based on the similarity scores correlated with the plurality of significant frames, and create at least one highlight video by selecting a cluster of sequential frames of the input video.

In a further implementation form of the first, second, and third aspects, further comprising: providing the at least one highlight video for playing on a webpage by a video player without audio.

In a further implementation form of the first, second, and third aspects, further comprising automatically generating a hyperlink to the input video from the at least one highlight video.

In a further implementation form of the first, second, and third aspects, clustering comprises: defining a dataset of sequential positions of frames of the video mapped to the similarity scores according to sequential position of the significant frames of each subset associated with each similarity score, identifying a plurality of local maximum values within the dataset, and clustering the frames of the video according to each local maximum value.

In a further implementation form of the first, second, and third aspects, further comprising applying a kernel function to the dataset to obtained a smoothed dataset, wherein the plurality of local maximum values are identified in the smoothed dataset.

In a further implementation form of the first, second, and third aspects, further comprising: defining a sliding window having a duration of the highlight video, iteratively applying the sliding window to the plurality of significant frames, wherein the subset includes significant frames falling within a current application of the sliding window.

In a further implementation form of the first, second, and third aspects, the sliding window is iteratively slide to a next significant frame.

In a further implementation form of the first, second, and third aspects, the similarity score is computed according to at least one value associated with each category identified for the subset that match at least one value associated with categories of the video-level features, for a number of significant frames of the subset.

In a further implementation form of the first, second, and third aspects, the visual features of the subset exclude audio of the input video and the video-level features of the input video is computed based on audio of the input video.

In a further implementation form of the first, second, and third aspects, creating the at least one highlight video comprises creating a plurality of highlight videos according to a decreased ranking of clusters from a highest similarity score.

In a further implementation form of the first, second, and third aspects, creating comprises generating instructions for selectively playing the selected cluster of sequential frames of the input video as the at least one highlight video without creating a new video file.

In a further implementation form of the first, second, and third aspects, creating comprises selecting the sequential frames of the selected cluster as the highlight video.

In a further implementation form of the first, second, and third aspects, further comprising: computing a normalized score by normalizing the similarity scores of the at least one highlight video, and presenting each of the at least one highlight video a relative number of times corresponding to the normalized similarity score, wherein the at least one highlight video are presented to a plurality of client terminals accessing a web page.

In a further implementation form of the first, second, and third aspects, further comprising performing A/B testing of the at least one highlight video presented the relative number of times corresponding to the normalized similarity score to obtain a click rate for each of the at least one highlight video.

In a further implementation form of the first, second, and third aspects, further comprising: generating a multi-record training dataset, wherein a record comprises a sample main video, and a ground truth of the at least one highlight video generated from the sample main video each labelled with a corresponding click rate, and training a machine learning model for generating an outcome of a target highlight video predicted to generate a highest click rate in response to an input of a target main video.

In a further implementation form of the first, second, and third aspects, further comprising: computing a probability score by normalizing the similarity scores of the at least one highlight video, creating a multi-record training dataset, wherein a record comprises: a sample main video, and a ground truth of the at least one highlight video generated from the sample main video each labelled by the corresponding probability score, and training a machine learning model for generating an outcome of a target highlight video representing a highest similarity to a target main video in response to an input of the target main video.

In a further implementation form of the first, second, and third aspects, further comprising: creating a multi-record training dataset, wherein a record comprises visual features of the subset, video-level features of the input video, and a ground truth label of the computed similarity score, training a similarity machine learning model, and computing the similarity score for a new input video by feeding the visual features of the subset and video-level feature of the new input video into the similarity machine learning model.

In a further implementation form of the first, second, and third aspects, further comprising: selecting a portion of the cluster having highest similarity score, the portion of the cluster having a time duration of the highlight video.

In a further implementation form of the first, second, and third aspects, a current frame is selected as a significant frame when change information indicative of content of the current frame is sufficiently different than a preceding significant frame.

In a further implementation form of the first, second, and third aspects, the plurality of significant frames are selected by: obtaining change information of the input video constructed of a plurality of encoded frames, the change information created for each of the plurality of encoded frames by an encoder is indicative of a difference between a visual content of a respective encoded frame and visual content of a predecessor encoded frame, performing following actions for each of the plurality of encoded frames: analyze the change information to calculate a cumulative difference between visual content of the respective encoded frame and visual content of a most recently selected significant frame previously selected from the plurality of encoded frames, and select the respective encoded frame as another significant frame in case the cumulative difference exceeds a predefined threshold.

In a further implementation form of the first, second, and third aspects, the visual features of the subset are computed as an aggregation of visual features of each significant frame of the subset, wherein visual features of each significant frame is computed by recognizing at least one object and/or text in the significant frame.

In a further implementation form of the first, second, and third aspects, the video-level features of the video is computed as a combination of an aggregation of visual features of the plurality of significant frames of the input video and an analysis of the input video as a whole.

In a further implementation form of the first, second, and third aspects, the analysis of the input video as a whole comprises extracting content features from the video using at least one approach from a group comprising: speech converted to text, title, description, metadata, natural language processing of textual data, optical character recognition, list of people in the input video, keywords mapped to the input video, categories assigned to the input video, and objects identified in the input video.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
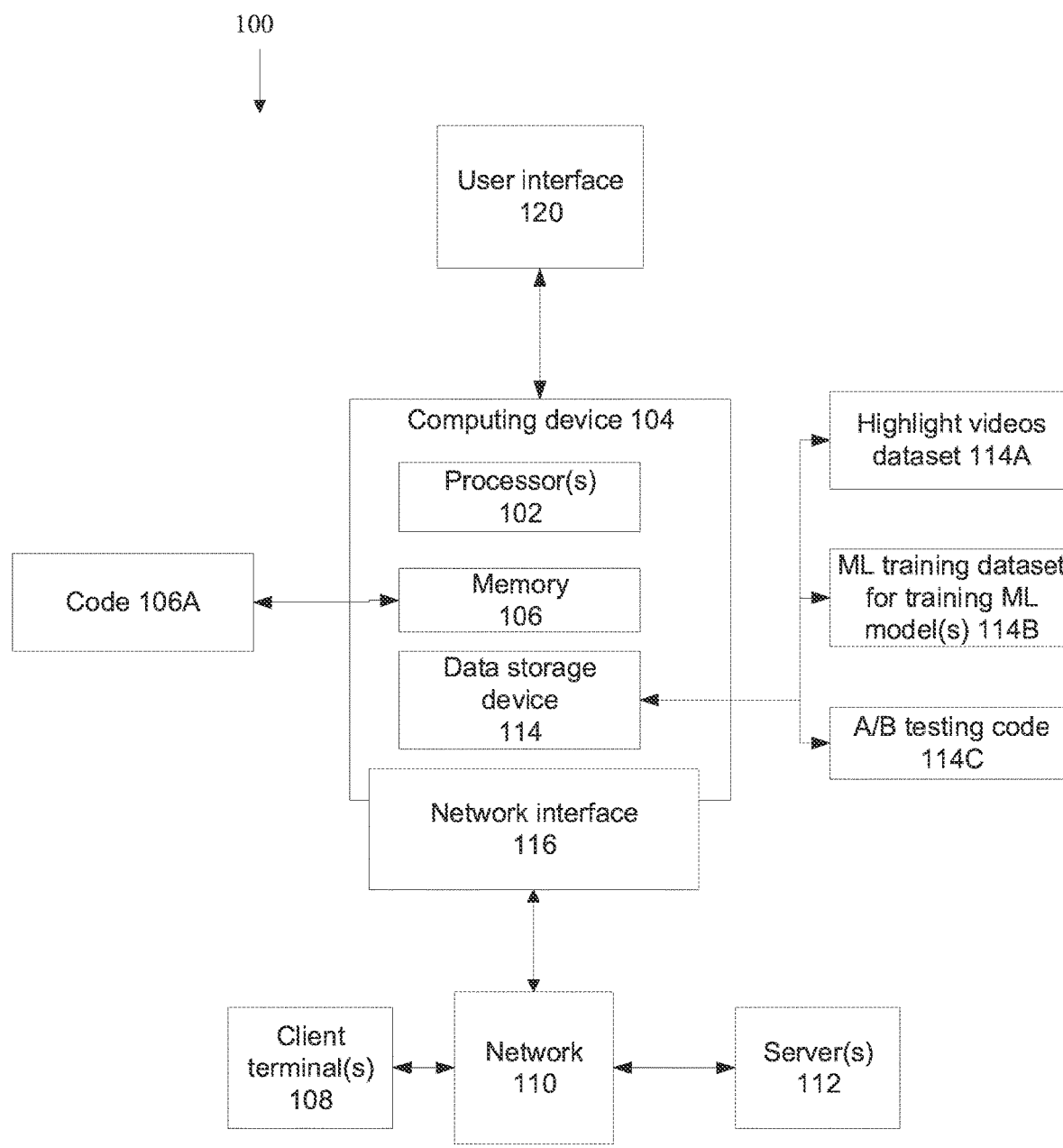
FIG. 1 is a is a block diagram of components of a system for generating one or more highlight videos from an input video, in accordance with some embodiments of the present invention.

The present invention, in some embodiments thereof, relates to generation of videos and, more specifically, but not exclusively, to generation of a preview video from a main video.

An aspect of some embodiments of the present invention relates to systems, methods, computing devices, and/or code instructions (stored on a data storage device and executable by one or more processors).

An aspect of some embodiments of the present invention relates to systems, methods, computing devices, and/or code instructions (e.g., stored on a data storage device and executable by one or more processors) for generating one or more highlight videos from an input video. The highlight video is designed as a preview for presentation to a user, for example, to help the user decide if to watch the input video. The highlight video includes selected frames of the input video representing the most visually significant frames of the video that best summarize the video. Significant frames of the input video are selected. Visual features are extracted for the selected significant frames. Video-level features of the input video are extracted. The video-level features may include audio, visual, and/or text based features. The video-level features are computed as a combination of an aggregation of the visual features extracted from the significant frames of the input video and an analysis of the input video as a whole. Subsets of the significant frames are iteratively selected, optionally by a sliding window of a predefined duration that is slide sequentially along frames of the video. For each subset, a similarity score indicating similarity between visual features of the subset and video-level features of the input video is computed. The input video is clustered into clusters of sequential frames according to sequential positions within the video based on the similarity scores correlated with the significant frames. One or more highlight videos are creating by selecting a cluster of sequential frames of the input video. For example, clusters of frames having a highest score are selected for a first highlight video. A second highlight video is created by selecting another cluster of frames having a second highest score. The highlight video is provided for presentation.

At least some embodiments described herein address the technical problem of generating a short preview video that summarizes a longer main video. The short preview video is designed to be short enough that it can be quickly viewed, yet provide enough scenes of the main video to enable a user to determine if they wish to view the main video. For example, on a news web site, one or more short videos summarizing longer news videos are presented. A user visiting the news site may quickly view the short videos, in order to determine which longer news video to watch. The selection of the short preview video is even more challenging when the short preview video is to be played without any audio. When only the visual component of the main video is relevant, the selection of the frames/scenes of the main video is even more important.

Using standard approaches, the preview is manually generated, for example, by an editor that manually views frames and scenes of the longer main video, selects frames and/or scenes that are interesting and/or summarize the longer main video, and assembles the selected frames and/or scenes into the short preview video. The limitation of such manual approach is the amount of time and/or human resources required, in particular when there is a large number of longer main videos and/or the main videos are long. In another approach, the first few seconds of the main video is used as the preview. The limitation of such an approach is that the first few seconds may be irrelevant to the content of the main video. For example, in a news report clip about a war, the first few seconds may be the news anchor speaking in a newsroom, prior to switching to the field news reporter with images of the war itself. In such a case, the first few seconds are irrelevant and one viewing them cannot determine the scope of the main video, especially without audio. In another approach, selection of different scenes of the main video, such as randomly, may create a preview that is different from what the main video is about. For example, in a main video about cars, in which there are scenes with cats walking that are caught inadvertently, presenting the scenes with the cats as the preview erroneously guides the user to thinking that the main video is about catch when in fact the video is about cars.

At least some embodiments described herein improve the technical field of video processing, by automatically generating a short preview video (referred to herein as a highlight video) from a longer main video (referred to herein as an input video) that includes the most visually significant sequence of frames of the longer main video. The highlight video may include the largest number and/or most significant visual objects of the input video, representing the best summary of the content of the input video.

Multiple highlight videos may be generated from the same input video. The multiple highlight videos may be used as an initial setup for training a machine learning model and/or for performing A/B testing, when no data is yet available (i.e., since no short preview videos have been presented yet). For example, each highlight video may be associated with a similarity score indicating similarity to video information of the input video (e.g., as a whole, and/or of multiple significant frames). The similarity scores may be normalized. The normalized scores may be used as the initial baseline for indicating relative probability of each highlight video (e.g., for training the ML model) and/or relative number of times for presenting each highlight video to client terminals accessing a webpage on which the highlight videos are presented, as described herein in additional detail.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
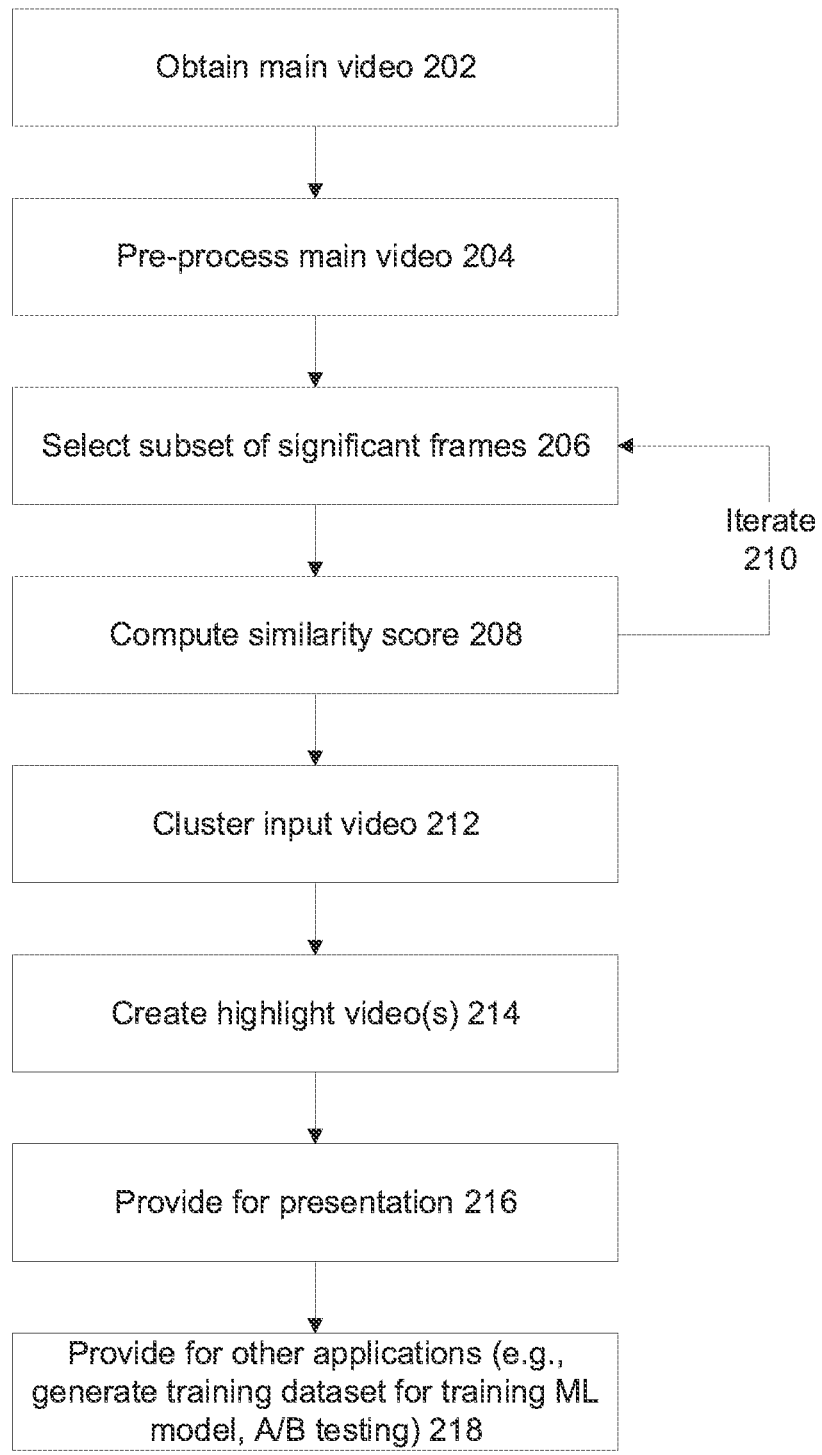
FIG. 2 is a flowchart of a method of generating one or more highlight videos from an input video, in accordance with some embodiments of the present invention.
Figure 3:
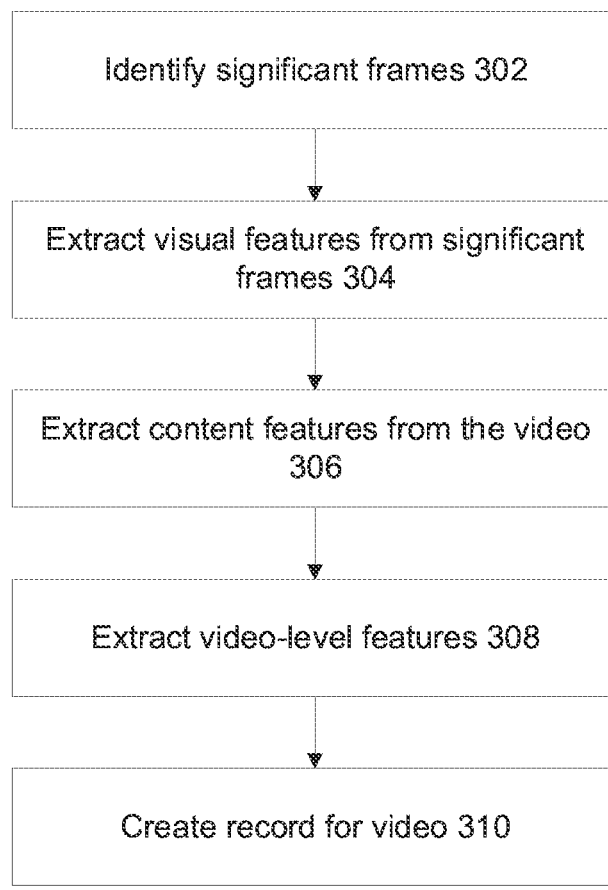
FIG. 3 is a method for pre-processing and/or analyzing the main video, in accordance with some embodiments of the present invention.

Reference is now made to FIG. 1, which is a block diagram of components of a system 100 for generating one or more highlight videos from an input video, in accordance with some embodiments of the present invention. Reference is also made to FIG. 2, which is a flowchart of a method of generating one or more highlight videos from an input video, in accordance with some embodiments of the present invention. Reference is also made to FIG. 3, which is as method for pre-processing and/or analyzing the main video, in accordance with some embodiments of the present invention.

System 100 may implement the acts of the method described with reference to FIGS. 2 and 3 by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2 and 3) to one or more client terminals 108 and/or servers 112 over a network 110. For example, providing software as a service (SaaS) to the client terminal(s) 108 and/or servers 112, providing software services accessible using a software interface (e.g., application programming interface (API), software development kit (SDK)), providing an application for local download to the client terminal(s) 108 and/or servers 112, providing an add-on to a web browser running on client terminal(s) 108 and/or servers 112, and/or providing functions using a remote access session to the client terminals 108 and/or servers 112, such as through a web browser executed by client terminal 108 and/or servers 112 accessing a web site hosted by computing device 104. For example, input videos are provided to computing device 104 by client terminal(s) 108 and/or servers 112 over network 110. Computing device 104 computes one or more highlight videos, optionally with associated similarity scores and/or other scores, as described herein. The highlight videos and/or associated scores may be provided back to the client terminal 108 and/or server 112 that provided the input video, and/or may be provided to another client terminal 108 and/or server 112, such as for presentation on a web page. Computing device 104 may generate ML training datasets 114B for training ML models and/or run A/B testing code 114C using the highlight videos and/or associated scores, as described herein.

A local architecture. Computing device 104 executing stored code instructions 106A that implement one or more of the acts described with reference to FIGS. 2 and 3 may be implemented as a standalone device, for example, a web server hosting one or more web sites, a kiosk or other terminal (e.g., tourist information boot), a client terminal, or a smartphone. Computing device 104 locally computes one or more highlight videos, optionally with associated similarity scores and/or other scores, for input videos which are obtained by computing device 104 and/or stored by computing device 104, as described herein. Computing device 104 may generate ML training datasets 114B for training ML models and/or run A/B testing code 114C using the highlight videos and/or associated scores, as described herein.

A combined local-central architecture. Computing device 104 may be implemented as a server that include locally stored code instructions 106A that implement one or more of the acts described with reference to FIGS. 2 and 3, while other acts described with reference to FIGS. 2 and 3 are handled by client terminal(s) 108 and/or server(s) 112. For example, computes one or more highlight videos, optionally with associated similarity scores and/or other scores, for input videos which are obtained by computing device 104 and/or stored by computing device 104, as described herein. For example, input videos are obtained from a client terminal 108, and the highlight videos are provided for presentation on web pages hosted by server(s) 112. ML training datasets 114B and/or training the ML models using datasets 114B and/or A/B testing 114C may be run by client terminal 108 and/or server(s) 112.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2 and 3 when executed by hardware processor(s) 102.

Computing device 104 may include a data storage device 114 for storing data, for example, highlight videos dataset 114A for storing the highlight video(s) created from the input video, ML training dataset(s) 114B for training ML model(s), and/or A/B testing code 114C for performing A/B testing, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 may be in communication with one or servers 112 and/or client terminal(s) 108 via network 110.

Computing device 104 includes and/or is in communication with one or more physical user interfaces 120 that include a mechanism for a user to enter data (e.g., select input video) and/or view data (e.g., view the highlight videos). Exemplary user interfaces 120 include, for example, one or more of, a touchscreen, a display, a virtual reality display (e.g., headset), gesture activation devices, a keyboard, a mouse, and voice activated software using speakers and microphone.

At 202, a main video is obtained. The main video may be obtained, for example, uploaded by a user, received from another computing device, accessed from a data storage device (e.g., local, remote), and the like. The main video may be, for example, as captured by a video camera, an animation, a movie, generated by saving a live stream feed, and the like.

The main video includes multiple sequential frames. The video may be of significant length, much longer than a selected length for a highlight video, for example, 5, 10, 20, 50, 100, 500, or 1000 times the length, or intermediate or longer values. For example, the main video is 10 minutes and the highlight video is 10 seconds, or the main video is 2 minutes and the high video is 5 seconds, or the main video is 2 hours and the highlight video is 7 seconds.

At 204, the main video may be pre-processed and/or analyzed, for one or more of:

Identifying significant frames. A current frame may selected as a significant frame when change information indicative of content of the current frame is sufficiently different than a preceding significant frame, for example, as described with reference to U.S. Pat. No. 10,412,391 "MINIMIZE NUMBER OF ENCODED VIDEO STREAM FRAMES FOR CONTENT RECOGNITION", filed on Aug. 6, 2018, by the same Inventor as the instant application. Alternatively or additionally, the significant frames are selected using other approaches, for example, selected at fixed intervals (e.g., one frame per second, one frame per 3 seconds, one frame per 5 seconds, or other smaller, intermediate or larger values), selected randomly (e.g., random selection of a selected number of frames, random selection of a frame per time interval), and/or other extracted feature (e.g., based on metadata of the video indicating breakup of the video into parts, based on a detected change of scene, and the like);

Extracting visual features for individual significant frames (e.g. for each significant frame). The extracted visual features may exclude audio of the input video; and Extracting video-level features for the video. The video-level features of the input video may be computed based on audio of the input video.

An exemplary process for pre-processing and/or analyzing the main video is described with reference to FIG. 3.

At 206, a subset of significant frames is selected.

The size of the subset, i.e., number of significant frames, may be selected according to a sliding window. The sliding window may have a predefined size. The predefined size may match a target duration of the highlight video that is being created. For example, when the highlight video being created is to have a duration of 5 seconds, the size of the sliding window is 5 seconds.

The subset includes significant frames falling within a current application of the sliding window.

Optionally, a first subset of significant features is selected by positioning the sliding window at the first significant frame of the video. I.e., the first significant frame is placed at the first position of the sliding window, followed by the second, third, fourth, etc., significant frames, until the sliding window is full.

At 208, for each subset, a similarity score indicating similarity between visual features of the subset and video-level features of the input video is computed.

The visual features of the subset may be computed as an aggregation of the visual features extracted for each significant frame of the subset. Optionally, a value associated with each respective visual feature may be weighed according to the number of frames the respective visual feature is found in the subset. For example, for a subset of five significant frames, when the visual feature is identification of a specific person, and the specific person is detected in two of the five frames, a value indicating 2/5, or a weight of 2, may be assigned to the value indicating the specific person. In another example, when the visual feature is identification of text indicating a name of a restaurant, and the text is detected in all five frames, a value indicating 5/5, or a weight of 5, may be assigned to the value indicating restaurants.

The similarity score may be computed according to visual features of the subset that match and/or correspond to video-level features of the input video. The similarity score may computed by values associated with the visual features of the subset that match and/or correspond to values associated with video-level features of the input video. For example, the similarity score may be computed according to one or more values associated with categories identified for the subset that match values of categories identified for the input video. For example, the similarity score may be computed accordingly when a certain actor is detected in the subset and also detected in the input video. The certain actor may be of a broader category such as people. The values may be weighted, for example, indicating an intensity of the visual feature, such as number of the same object depicted in a single frame. For example, when 5 cars are detected, the value is 5. When 10 cars are detected, the value is 10. The similarity score may be computed for indicating similarity between the 5 cars and the 10 cars.

It is noted that visual features of the subset may correspond to visual-level features of the input video that are computed from non-visual sources, such as audio sources. For example, a specific actor that is visually detected as a visual feature of the subset may correspond to a visual-level feature of the input video computed from audio, such as detecting the name of the actor spoken by another person depicted in the video when the actor is not visually present in the video.

The similarity score may be computed using one or more approaches. Some not necessarily limiting exemplary approaches for computing the similarity score are now described:

A count of number of values of a category of visual features of the subset that match the same values of the same category of video-level features of the input video. For example, a dog and a house are found in both the subset and the input video.

A cross correlation function is applied to measure similarity between a representation of the visual features of the subset and a representation of video-level features of the input video.

The visual features of the subset are fed into an encoder that generates a first encoding, and the video-level features of the input video are fed into the encoder to obtain a second encoding. The similarity score is computed as a statistical distance between the first and second encodings. For example, the encoder is implemented as a neural network, where the encoding is extracted from one or more hidden layers, such as weights of neurons in response to an input of the features. The first and second encodings may be represents as vectors/points in a multi-dimensional space, where the similarity score is computed as a Euclidean distance between the vectors/points.

A trained similarity machine learning model. The trained similarity machine learning model is fed the visual features of the subset and the video-level features, and generates the similarity score as an outcome. Such similarity machine learning model may be used when insufficient training dataset is available for training such similarity model, for example, prior to computations of similarity scores using other approaches described herein. Once sufficient number of similarity scores have been computed, a multi-record training dataset may be created, and the similarity machine learning model may be trained on the multi-record training dataset for use during subsequent computations of similarity scores. A record may include visual features of the respective subset, video-level features of the respective input video, and a ground truth label of the similarity score which may be computed using other approaches described herein. Alternatively or additionally, the similarity machine learning model may be fed the significant frames of the subset and the input video as images/frames, i.e., rather than the extracted features. Such similarity machine learning model maybe trained on a training dataset of records, where each record includes the frames of the respective subset, the respective input video, and the ground truth label of the similarity score. Such similarity machine learning model may be implemented, for example, as a classifier, a statistical classifier, one or more neural networks of various architectures (e.g., convolutional, fully connected, deep, encoder-decoder, recurrent, graph, combination of multiple architectures), support vector machines (SVM), logistic regression, k-nearest neighbor, decision trees, boosting, random forest, a regressor and the like.

At 210, features 206 and 208 are iterated. The sliding window is iteratively slide to a next significant frame. The sliding window is then applied to the new subset of significant frames.

The sliding window may be applied in an overlapping manner, such that a next application of the sliding window overlaps with a preceding application of the sliding window. The overlap may be, for example, 10%, or 25%, or 50%, or 75%, or other smaller, intermediate, or larger values. The overlap may be full except for a single significant frame, by iteratively sliding the sliding window one significant frame at a time. Alternatively, the sliding window is applied sequentially without overlap.

At 212, the input video is clustered into multiple clusters of sequential frames.

Different clustering approaches may be used. Some exemplary clustering approaches are now described:

A simple clustering approach divides the non-significant frames between the significant frames in the middle. For example, in a video of 100 frames, where frames 10 and 80 are significant, the middle between 10 and 80 is 45; frames 11-45 are clustered with significant frame 10 (along with frames 0-9), and frames 46-79 are clustered with significant frame 80 (along with frames 81-100).

Another clustering approach is now described. The clustering may be done according to sequential positions within the video based on the similarity scores correlated with the significant frames. A dataset may be defined. The dataset may include sequential positons of the frames of the video, optionally all frames including the significant frames. The sequential positions of the frames are mapped to the similarity scores according to sequential positions of the significant frames of each subset associated with each similarity score. Sequential frames of the video, located between sequential frames, are mapped to the computed similarity scores. Local maximum values may be defined within the dataset. The frames of the video may be clustered according to each local maximum value.

For example, bins centered around each significant frame are sized according to relative similarity scores of each significant frame. For example, for a video of 100 frames, where a first significant frame at frame 20 has a similarity score of 10, and a second similarity frame at position 80 has a similarity score of 20, the bin size at position 80 may be twice the size of the bin at position 20, such that the 60 frames separating the two significant frames are divided in a 2:1 ratio. I.e., frames 21-40 are clustered with the first significant frame at frame 20, and frames 41-80 are clustered with the second significant frame at position 80. The local maximum values used for clustering of the frames may be identified in the smoothed dataset.

Alternatively or additionally, the non-significant frames between significant frames are mapped to the similarity scores computed for the significant frames. For example, a first distribution function is defined, where scores of non-significant frames is zero, and scores of the significant frames are computed as described herein. The first distribution function may be smoothed such that the non-significant frames are assigned similarity scores, for example, by applying a kernel function to obtain a smoothed dataset.

Alternatively or additionally, the kernel function is applied to the dataset to obtain a smoothed dataset. The local maximum values used for clustering of the frames may be identified in the smoothed dataset.

Exemplary kernel functions and/or distribution functions include: Gaussian, tophat, exponential, linear, cosine, and the like.

Clustering may be done according to the similarity scores which are assigned to the non-significant frames, such as by the smoothing functions, optionally using the local maximum values as center points. The local maximum values may correspond to the significant frames. Exemplary clustering approaches include: k nearest neighbor, mean-shift clustering, density-based spatial clustering and hierarchical clustering.

At 214, one or more highlight videos are created.

A highlight video is created by selecting a cluster of sequential frames of the input video.

A highlight video may be created by selecting a portion of the cluster having a selected similarity score, optionally a highest similarity score. The selected portion of the cluster has a time duration according to a target duration of the highlight video.

Optionally, multiple highlight videos are created. The number of highlight videos may be selected, for example, by a user, according to the duration of the main video, and the like. The multiple videos may be created according to a set of rules defining the clusters, for example, decreased ranking of clusters from a highest similarity score. For example, when three highlight videos are to be created, the clusters with the top three similarity scores are selected.

The created highlight video may be a new video file created from the main video by copying frames of the selected cluster. Alternatively or additionally, the highlight video may be created by automatically generating instructions (e.g., code, pseudocode, rules, text) for selectively playing the selected cluster of sequential frames of the input video as the highlight video. The instructions may use the input video without creating a new video file. For example, a player on a web page is fed the instructions for selectively playing the selected cluster of sequential frames from the main video without creating and playing a new video file.

The created highlight video(s) may be created using visual frames while excluding the audio component, for generating a visual-only highlight video. Audio may be excluded, for example, when multiple highlight videos are created and designed to be presented simultaneously. Simultaneously playing multiple audio tracts of the multiple highlight videos may result in a jumble, making such simultaneously audio play undesired. Alternatively, the created highlight video(s) may be created using visual frames and including the audio component, for generating an audio-visual highlight video.

At 216, the highlight video(s) may be provided, for example, played on a display, stored on a data storage (e.g., local storage, remote storage), forwarded to another computing device (e.g., over a network), fed into another process (e.g., video analysis application), and/or other applications as described with reference to feature 218 of FIG. 2.

Optionally, the highlight video(s) is provided for playing on a webpage by a video player. Multiple highlight videos may be simultaneously presented and played, for example, within small windows on the web page. The video may be played without audio, for example, to avoid simultaneously play of multiple audio tracts of the multiple highlight videos.

Optionally, a hyperlink is generated for each respective highlight video, that links to the input video. The highlight video may serve as the hyperlink, such that clicking on the playing highlight video triggers playing of the input video.

Optionally, a normalized score is computed for each highlight video. The normalized score may be computed by normalizing the similarity scores of the highlight videos, i.e., the similarity score of the cluster used to generate the respective highlight video. For example, when the similarity scores are 10, 25, and 35, for three highlight videos, the normalized scores are respectively 0.14, 0.36, and 0.50. Each of the highlight videos may be played a relative number of times corresponding to the normalized similarity score. The highlight videos may be played the relative number of times to different client terminals accessing a web page, for example, per access. For example, for 100 accesses to the web page by web browsers on the client terminals, the first highlight video is played 14 times, the second highlight video is played 36 times, and the third highlight video is played 50 times.

Alternatively or additionally, a probability score is computed by normalizing the similarity scores of the highlight videos.

At 218, the highlight videos may be used for A/B testing and/or for generating a training dataset for training one or more a machine learning models.

Optionally, A/B testing is performed, using the highlight videos presented the relative number of times corresponding to the normalized similarity score. The A/B testing may be performed to compute a selected metric, for example, click rate, user engagement, and the like.

Alternatively or additionally, one or more ML models may be trained. Exemplary architectures of the ML model(s) include: a classifier, a statistical classifier, one or more neural networks of various architectures (e.g., convolutional, fully connected, deep, encoder-decoder, recurrent, graph, combination of multiple architectures), support vector machines (SVM), logistic regression, k-nearest neighbor, decision trees, boosting, random forest, a regressor and the like.

In one example, a multi-record training dataset is generated. A record of the training dataset includes a sample main video, and a ground truth of the one or more highlight videos generated from the sample main video. The ground truth may further include a label of a click rate computed for the respective highlight video from the A/B testing. A machine learning model may be trained on the multi-record training dataset for generating an outcome of a target highlight video in response to an input of a target main video. The target highlight video may represent the highest similarity to the target main video. When the training dataset includes the click rate, the target highlight video outcome may be predicted to generate a highest click rate in response to the input of the target main video.

Referring now back to FIG. 3, the main video is pre-processed and/or analyzed, for: (i) identifying significant frames, (ii) extracting visual features for individual significant frames and (iii) extracting video features for the video, as described in additional detail.

At 302, multiple significant frames of the video are identified.

Optionally, the significant frames are identified based on change information between frames indicating changes in content. Frames may be identified as significant frames when a current frame is sufficiently different in terms of content from a previous significant frame and/or a maximum amount of time has elapsed between a current frame and a previously selected significant frame. Optionally, a current frame is selected as a significant frame when change information indicative of content of the current frame is sufficiently different than a preceding significant frame.

Significant frame may be selected by the following exemplary process: The input video may be constructed of encoded frames. Change information of the input video is created for each of the encoded frames by an encoder of the encoded video stream. The change information is indicative of a difference between a visual content of a respective encoded frame and visual content of a predecessor encoded frame. The following actions are performed for each of the encoded frames: analyzing the change information to calculate a cumulative difference between visual content of the respective encoded frame and visual content of a most recently selected significant frame previously selected from the encoded frames, and selecting the respective encoded frame as another significant frame in case the cumulative difference exceeds a predefined threshold. Additional exemplary details of a process for selecting significant frames is described, for example, with reference to U.S. Pat. No. 10,412,391 "MINIMIZE NUMBER OF ENCODED VIDEO STREAM FRAMES FOR CONTENT RECOGNITION", filed on Aug. 6, 2018, by the same Inventor as the instant application.

Alternatively or additionally, the significant frames are selected using other approaches, for example, selected at fixed intervals (e.g., one frame per second, one frame per 3 seconds, one frame per 5 seconds, or other smaller, intermediate or larger values), selected randomly (e.g., random selection of a selected number of frames, random selection of a frame per time interval), and/or other extracted feature (e.g., based on metadata of the video indicating breakup of the video into parts, based on a detected change of scene, and the like).

At 304, significant frames are individually analyzed for extraction of visual features. Visual features may be extracted from each individual significant frame. Visual features of each significant frame may be computed, for example, by recognizing one or more object and/or text in the significant frame. The visual features may exclude audio of the input video.

Exemplary visual features include: recognized people, recognized brands of objects, text extracted by optical character recognition, and a general recognition of the image depicted in the frame (e.g., labelling).

Additional exemplary details of a process for extraction of visual features of significant frames is described, for example, with reference to U.S. Utility patent application Ser. No. 17/665,636 "CORRELATING AUTOMATICALLY OBJECTS DETECTED IN A VIDEO RECORDED PRESENTATION WITH SLIDES OF THE PRESENTATION", filed on Feb. 7, 2022, by the same Inventor as the instant application.

At 306, content features of the video are extracted (e.g., computed). The content features may be, for example, one or more of visual features, text features, and/or audio features.

The input video, optionally as a whole, may be analyzed. The analysis may include extraction of the content features, and/or computation of the content features (i.e., where the extracted features are the computed features.

The content features may be extracted from the video as a whole, from the significant frames, and/or from other frames which were not identified as significant. The content features may be extracted, for example, based on an analysis of content of the input video, optionally an analysis of the input video as a whole.

Exemplary approaches for analyzing the input vide for extraction of content features include: speech to text conversion, from a title of the video, from a description of the video, from metadata associate from the video, from optical character recognition of text appearing in the video, automatic object recognition of objects in the video (e.g., people, inanimate physical objects, animals), keywords mapped to the input video, categories assigned to the input video, and/or from a natural language processing of textual data.

Additional exemplary details of a process for extraction of content features from a video are described, for example, with reference to U.S. Utility patent application Ser. No. 17/585,679 "CREATING AUTOMATICALLY A SHORT CLIP SUMMARIZING HIGHLIGHTS OF A VIDEO STREAM", filed on Jan. 27, 2022, and/or U.S. Utility patent application Ser. No. 17/665,636 "CORRELATING AUTOMATICALLY OBJECTS DETECTED IN A VIDEO RECORDED PRESENTATION WITH SLIDES OF THE PRESENTATION", filed on Feb. 7, 2022, by the same Inventor as the instant application, incorporated herein by reference in its entirety.

At 308, video-level features of the video are extracted (e.g., computed). The video-level features may be an aggregation of the visual feature extracted from multiple significant frames (e.g., as described with reference to 304), and/or content features extracted from the video (e.g., as described with reference to 306). The video-level features may include, for example, a list of an aggregation of the following identified in the significant frames: people, brands, keywords, categories, and the like. The video-level features may include one or more of: text features, audio features video, and visual features.

At 310, a record and/or other dataset representation may be created. The record and/or other dataset representation may be created for the video, for storing the video-level features of the video, and for storing the visual features per significant feature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant videos will be developed and the scope of the term video is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating at least one highlight video from an input video, comprising, using at least one processor for:
    identifying a plurality of significant frames of the input video;
    computing video-level features of the input video;
    selecting a plurality of subsets of the plurality of significant frames;
    for each subset, computing a similarity score indicating similarity between visual features of the subset and video-level features of the input video;
    clustering the input video into a plurality of clusters of sequential frames according to sequential positions within the video based on the similarity scores correlated with the plurality of significant frames;
    creating at least one highlight video by selecting a cluster of sequential frames of the input video;
    computing a normalized score by normalizing the similarity scores of the at least one highlight video, and presenting each of the at least one highlight video a relative number of times corresponding to the normalized similarity score, wherein the at least one highlight video are presented to a plurality of client terminals accessing a web page;
    testing the at least one highlight video presented the relative number of times corresponding to the normalized similarity score to obtain a click rate for each of the at least one highlight video;
    generating a multi-record training dataset, wherein a record comprises a sample main video, and a ground truth of the at least one highlight video generated from the sample main video each labelled with a corresponding click rate; and
    training a machine learning model for generating an outcome of a target highlight video predicted to generate a highest click rate in response to an input of a target main video.

2. The computer implemented method of claim 1, further comprising:
    providing the at least one highlight video for playing on a webpage by a video player without audio.

3. The computer implemented method of claim 1, further comprising automatically generating a hyperlink to the input video from the at least one highlight video.

4. The computer implemented method of claim 1, wherein clustering comprises:
    defining a dataset of sequential positions of frames of the video mapped to the similarity scores according to sequential position of the significant frames of each subset associated with each similarity score;
    identifying a plurality of maximum values within the dataset; and
    clustering the frames of the video according to each maximum value.

5. The computer implemented method of claim 4, further comprising applying a kernel function to the dataset to obtained a smoothed dataset, wherein the plurality of maximum values are identified in the smoothed dataset.

6. The computer implemented method of claim 1, further comprising:
    defining a sliding window having a duration of the highlight video;
    iteratively applying the sliding window to the plurality of significant frames, wherein the subset includes significant frames falling within a current application of the sliding window.

7. The computer implemented method of claim 6, wherein the sliding window is iteratively slide to a next significant frame.

8. The computer implemented method of claim 1, wherein the similarity score is computed according to at least one value associated with each category identified for the subset that match at least one value associated with categories of the video-level features, for a number of significant frames of the subset.

9. The computer implemented method of claim 1, wherein the visual features of the subset exclude audio of the input video and the video-level features of the input video is computed based on audio of the input video.

10. The computer implemented method of claim 1, wherein creating the at least one highlight video comprises creating a plurality of highlight videos according to a decreased ranking of clusters from a highest similarity score.

11. The computer implemented method of claim 1, wherein creating comprises generating instructions for selectively playing the selected cluster of sequential frames of the input video as the at least one highlight video without creating a new video file.

12. The computer implemented method of claim 1, wherein creating comprises selecting the sequential frames of the selected cluster as the highlight video.

13. The computer implemented method of claim 1, further comprising:
    computing a probability score by normalizing the similarity scores of the at least one highlight video;
    creating a multi-record training dataset, wherein a record comprises: a sample main video, and a ground truth of the at least one highlight video generated from the sample main video each labelled by the corresponding probability score; and
    training a machine learning model for generating an outcome of a target highlight video representing a highest similarity to a target main video in response to an input of the target main video.

14. The computer implemented method of claim 1, further comprising:
    creating a multi-record training dataset, wherein a record comprises visual features of the subset, video-level features of the input video, and a ground truth label of the computed similarity score;
    training a similarity machine learning model; and
    computing the similarity score for a new input video by feeding the visual features of the subset and video-level feature of the new input video into the similarity machine learning model.

15. The computer implemented method of claim 1, further comprising: selecting a portion of the cluster having highest similarity score, the portion of the cluster having a time duration of the highlight video.

16. The computer implemented method of claim 1, wherein a current frame is selected as a significant frame when change information indicative of content of the current frame is sufficiently different than a preceding significant frame.

17. The computer implemented method of claim 1, wherein the plurality of significant frames are selected by:
    obtaining change information of the input video constructed of a plurality of encoded frames, the change information created for each of the plurality of encoded frames by an encoder is indicative of a difference between a visual content of a respective encoded frame and visual content of a predecessor encoded frame;

performing following actions for each of the plurality of encoded frames:
analyze the change information to calculate a cumulative difference between visual content of the respective encoded frame and visual content of a most recently selected significant frame previously selected from the plurality of encoded frames, and
select the respective encoded frame as another significant frame in case the cumulative difference exceeds a predefined threshold.

18. The computer implemented method of claim 1, wherein the visual features of the subset are computed as an aggregation of visual features of each significant frame of the subset, wherein visual features of each significant frame is computed by recognizing at least one object or text in the significant frame.

19. The computer implemented method of claim 1, wherein the video-level features of the video is computed as a combination of an aggregation of visual features of the plurality of significant frames of the input video and an analysis of the input video as a whole.

20. The computer implemented method of claim 19, wherein the analysis of the input video as a whole comprises extracting content features from the video using at least one approach from a group comprising: speech converted to text, title, description, metadata, natural language processing of textual data, optical character recognition, list of people in the input video, keywords mapped to the input video, categories assigned to the input video, and objects identified in the input video.

21. A system for generating at least one highlight video from an input video, comprising:
at least one processor executing a code for:
identifying a plurality of significant frames of the input video;
computing video-level features of the input video;
selecting a plurality of subsets of the plurality of significant frames;
for each subset, computing a similarity score indicating similarity between visual features of the subset and video-level features of the input video;
clustering the input video into a plurality of clusters of sequential frames according to sequential positions within the video based on the similarity scores correlated with the plurality of significant frames; and
creating at least one highlight video by selecting a cluster of sequential frames of the input video;
computing a normalized score by normalizing the similarity scores of the at least one highlight video, and presenting each of the at least one highlight video a relative number of times corresponding to the normalized similarity score, wherein the at least one highlight video are presented to a plurality of client terminals accessing a web page;
testing the at least one highlight video presented the relative number of times corresponding to the normalized similarity score to obtain a click rate for each of the at least one highlight video;
generating a multi-record training dataset, wherein a record comprises a sample main video, and a ground truth of the at least one highlight video generated from the sample main video each labelled with a corresponding click rate; and
training a machine learning model for generating an outcome of a target highlight video predicted to generate a highest click rate in response to an input of a target main video.

22. A non-transitory medium storing program instructions for generating at least one highlight video from an input video, which, when executed by at least one processor, cause the at least one processor to:
identify a plurality of significant frames of the input video;
compute video-level features of the input video;
select a plurality of subsets of the plurality of significant frames;
for each subset, compute a similarity score indicating similarity between visual features of the subset and video-level features of the input video;
cluster the input video into a plurality of clusters of sequential frames according to sequential positions within the video based on the similarity scores correlated with the plurality of significant frames; and
create at least one highlight video by selecting a cluster of sequential frames of the input video;
computing a normalized score by normalizing the similarity scores of the at least one highlight video, and presenting each of the at least one highlight video a relative number of times corresponding to the normalized similarity score, wherein the at least one highlight video are presented to a plurality of client terminals accessing a web page;
testing the at least one highlight video presented the relative number of times corresponding to the normalized similarity score to obtain a click rate for each of the at least one highlight video;
generating a multi-record training dataset, wherein a record comprises a sample main video, and a ground truth of the at least one highlight video generated from the sample main video each labelled with a corresponding click rate; and
training a machine learning model for generating an outcome of a target highlight video predicted to generate a highest click rate in response to an input of a target main video.

* * * * *